L. KAUFMAN.
HOLLOW WATER HEATING GRATE.
APPLICATION FILED FEB. 15, 1910.
976,080.
Patented Nov. 15, 1910.
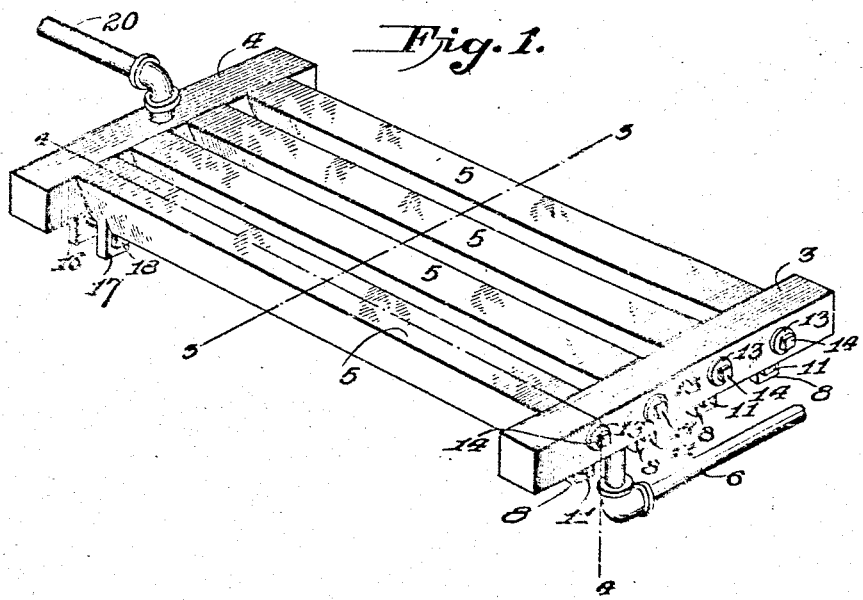
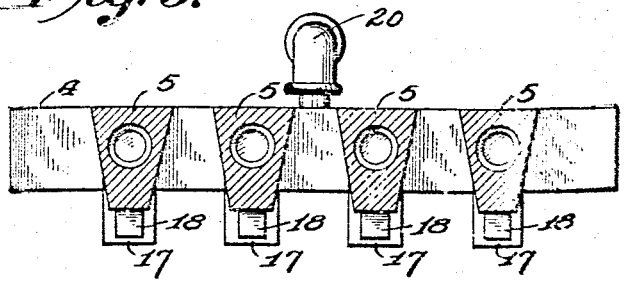
Inventor
Ludwig Kaufman.

L. KAUFMAN.
HOLLOW WATER HEATING GRATE.
APPLICATION FILED FEB. 15, 1910.

976,080.

Patented Nov. 15, 1910.

Inventor
Ludwig Kaufman,

UNITED STATES PATENT OFFICE.

LUDWIG KAUFMAN, OF NEW YORK, N. Y., ASSIGNOR OF ONE-HALF TO JAMES MURRAY, OF NEW YORK, N. Y.

HOLLOW WATER-HEATING GRATE.

976,080.   Specification of Letters Patent.   Patented Nov. 15, 1910.

Application filed February 15, 1910. Serial No. 543,915.

*To all whom it may concern:*

Be it known that I, LUDWIG KAUFMAN, citizen of the United States, residing at 558 West One Hundred and Eighty-first street, New York, in the county of New York and State of New York, have invented certain new and useful Improvements in Hollow Water-Heating Grates, of which the following is a specification, reference being had therein to the accompanying drawing.

This invention relates to grates for steam boilers and furnaces, and the principal object of the same is to provide a grate that is constructed so that a circulation of water may be had therethrough so that said water will be heated by the grate.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 2:
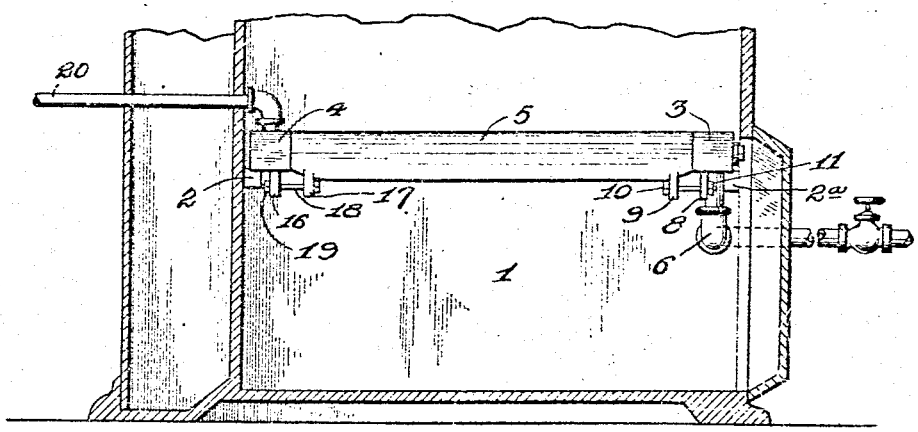
Figure 4:
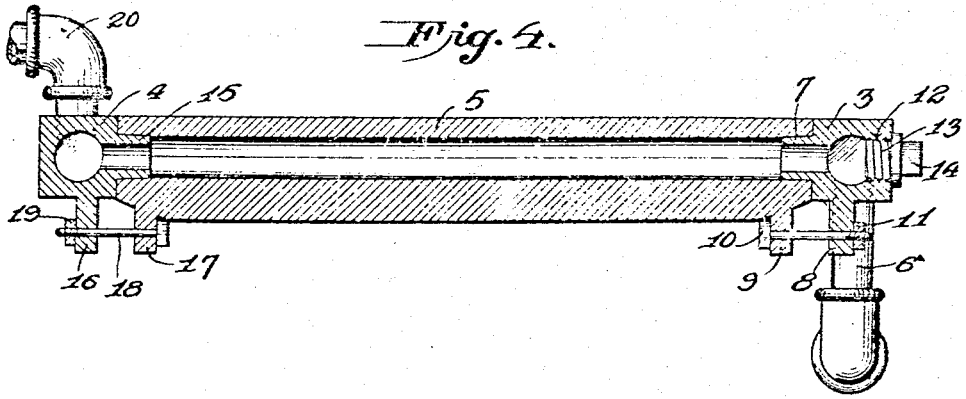

Figure 1 is a detail perspective view of the improved grate. Fig. 2 is a fragmentary vertical sectional view of the ash-pit of a stove, showing the improved grate therein. Fig. 3 is a transverse sectional view taken on the line 3—3, Fig. 1. Fig. 4 is a longitudinal sectional view taken on the line 4—4, Fig. 1.

Referring to said drawings by numerals, 1 designates the ash-pit of a stove furnace or boiler which is provided with the usual ledges 2—2ª for supporting the grate.

The improved water heating grate comprises the hollow end bars 3—4 and the spaced apart parallel hollow bars 5 that connect said end bars 3—4. End bar 3 is the water receiving chamber, and has a pipe communication 6 with a source of cold water supply, not shown. Said chamber is preferably rectangular so that it will present a flat upper surface and its inner longitudinal side is provided with a plurality of regularly spaced apart laterally arranged outwardly projecting tubular nipples 7 which correspond in number with the grate bars 5 and enter one end of the same so that said grate bars will have a flush engagement with said chamber 3. Chamber 3 is also provided with a plurality of pendent lugs 8 which correspond in number and arrangement with the grate bars 5 and are fastened to similar lugs 9 of said grate bars 5 by the bolts 10 and nut 11. Chamber 3 on its outer longitudinal side is provided with a plurality of regularly spaced apart threaded openings 12 which communicate with the interior of said chamber. A plug 13 is provided for each opening 12, said plugs being provided with a nut-shaped head 14 so that they may be grasped by a wrench to remove said plugs from said openings.

End bar 4, which is a receiving chamber for the heated water from the grate bars 5, is of the same shape as chamber 3 and is provided with nipples 15 that enter the grate bars, and with pendent lugs 16 that are fastened to lugs 17 of grate bars 5 by the bolts 18 and nut 19 in the same manner as that described in connection with chamber 3. A discharge pipe 20 extends from chamber 3 and communicates with the usual boiler, not shown.

As is shown more clearly in Fig. 3, the grate bars 5 present a flat top surface that is flush with the top surfaces of end chambers 3 and 4, and their bottom surface is narrower than their top surfaces, thereby providing a tapering opening between the grates, which permits a good draft to be had through the grate, and also facilitates raking from the underside of the grate. It will also be understood that by providing the end chambers 3—4 and the grate bars 5 with flush flat top surfaces, the coals are supported evenly.

As will be understood from the foregoing, the circulation is through supply pipe 6 to cold water receiving chamber 3 from which the water is distributed through bars 5 to chamber 4, and from chamber 4, through discharge pipe 20 to the boiler.

It is obvious that the circulation of water through the grate increases the life of the grate in addition to facilitating the water heating operation. It will also be clear that the bolt and lug connections between the grate bars and the end chambers, permits said parts to be normally held in a rigid relative position and also permits said parts to be held in sealed relation, yet said parts may be readily separated when necessary or desirable. And further the openings of chamber 3, provide means whereby access may be had to the interior of chamber 3, and as said opening alines with the openings through the grate bars, a cleaning tool may be passed therethrough to remove sediment from said grate bars.

What I claim as my invention is:—

1. A water heating grate comprising hollow end chambers, hollow grate bars communicating therewith, pendent lugs carried by said chambers, pendent lugs carried by said bars, means for rigidly but detachably fastening the lugs of the bars to the lugs of the chambers, means for supplying water to one chamber, and means for discharging water from the other chamber.

2. A water heating grate comprising hollow chambers, one being in communication with a source of supply water and the other adapted to discharge water, hollow grate bars communicating with and connecting said chambers, and fastening means for detachably holding said bars and chambers in rigid engagement with their upper surfaces in flush relation.

3. A water heating grate comprising end chambers, and hollow grate bars connecting the same, said chambers and grate bars having their upper surfaces flat and in flush relation, and means for detachably fastening said bars to said chambers.

4. A water heating grate comprising hollow chambers each provided with a plurality of outwardly projecting nipples, hollow grate bars engaging the opposite nipples of said chambers, means for supplying water to one chamber, means for discharging water from the other chamber, and means for detachably fastening the bars to the chambers with the upper surfaces thereof in flush relation.

In testimony whereof I hereunto affix my signature in presence of two witnesses.

LUDWIG KAUFMAN.

Witnesses:
HYMAN J. REIT.
ALEXANDER H. KAMINSKY.